E. F. BURGESS.
VEHICLE SPRING RETAINING MEANS.
APPLICATION FILED APR. 12, 1920.
1,379,798. Patented May 31, 1921.
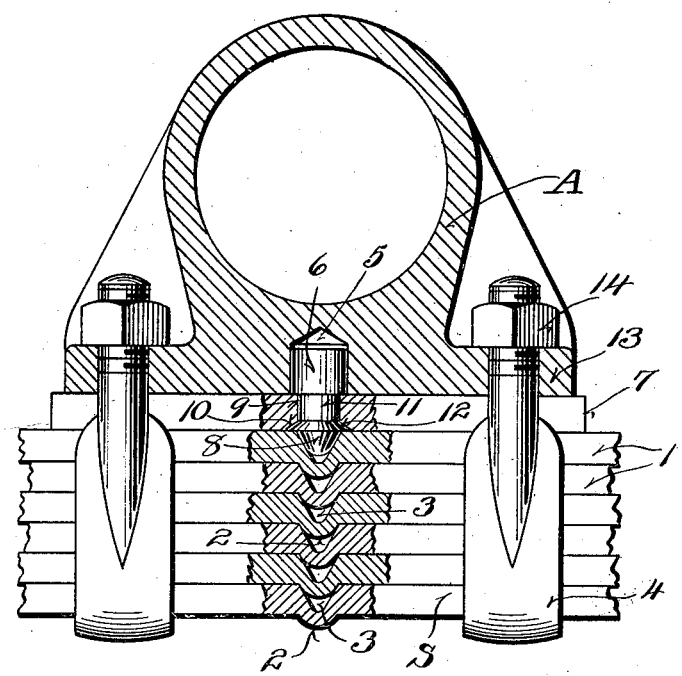
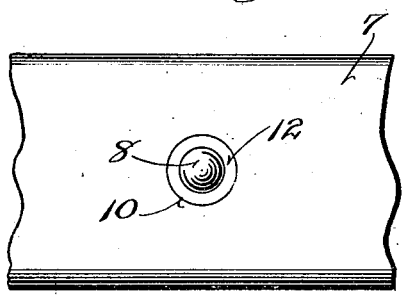
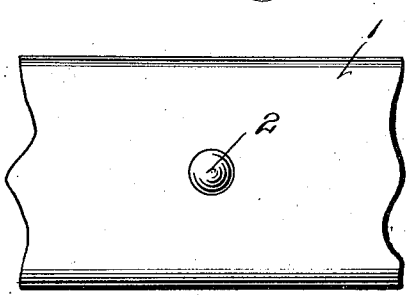
Inventor
Earl F. Burgess

UNITED STATES PATENT OFFICE.

EARL F. BURGESS, OF RACINE, WISCONSIN.

VEHICLE-SPRING-RETAINING MEANS.

1,379,798.   Specification of Letters Patent.   Patented May 31, 1921.

Application filed April 12, 1920. Serial No. 373,143.

*To all whom it may concern:*

Be it known that I, EARL F. BURGESS, a citizen of the United States, and resident of Racine, in the county of Racine and State of Wisconsin, have invented certain new and useful Improvements in Vehicle-Spring-Retaining Means; and I do hereby declare that the following is a full, clear, and exact description thereof.

My invention relates to new and useful improvements in vehicle, particularly automobile and other motor vehicle, springs, and pertains specifically to means for applying such springs to the vehicle axles or similar corresponding parts.

Inasmuch as it is essential to prevent shifting of the plates of vehicle leaf springs with respect to each other, various methods have been devised for holding the individual plates. It is likewise essential that the springs be centered and retained against shifting independently of the axles or other parts with which they are used. One means for accomplishing the first of these results is to press the material of the spring plates through from one side thereof beyond the surrounding surface of the other thus providing a socket in one face of each plate and a boss on the other face. By superimposing the required number of plates to form a spring of requisite strength and disposing the bosses thereof in the corresponding sockets of the adjacent plates, the same are held against shifting when clamped together by spring clips or the like.

A compound leaf spring thus formed of several plates and held together in this manner may be centered with respect to the vehicle axle or similar part by positioning the boss of one of the outermost plates in a socket formed in said axle or the like. When the spring is overslung and rests on the top of the axle or the like with the several bosses of the spring plates disposed downwardly, a most efficient structure results and there is very little likelihood of the leaves of the spring breaking, becoming disalined or shifting with respect to the axle.

On the other hand when the spring is underslung and it is necessary to invert the plates and dispose said bosses upwardly so as to provide a projection for engagement in the socket in the under side of the axle or the like, the result is not so efficient. In other words it is important when this manner of holding the spring plates against shifting with respect to each other is used that the bosses be extended downwardly. Therefore the primary object of this invention is to provide an arrangement whereby the bosses for retaining the spring plates together may be extended downwardly and the complete spring at the same time held effectively against shifting with respect to the under side of the axle or the like.

With this general object in view the invention resides in the novel features of construction, combination and arrangement of parts which will be hereinafter more particularly described and claimed and shown in the accompanying drawing in which:

Figure 1 represents a vertical cross sectional view of a vehicle axle showing the manner in which the central portion of a compound leaf spring may have its leaves secured against shifting and to the latter.

Fig. 2 is a plan view of a portion of the axle engaging plate, and

Fig. 3 is a similar view of a portion of one of the main spring plates.

Referring to Fig. 1 of the drawing more particularly, the ordinary means for securing the leaf plates 1 of a leaf spring S against shifting with respect to each other may be seen. Such a method eliminates the necessity for punching holes in the plates to extend a retaining bolt therethrough, and consists in providing each of the plates 1 with a boss 2 and a socket 3. Both the boss and socket of each plate are simultaneously formed by punching the plate with a suitable die while hot. As shown in this figure, while a pronounced boss is formed, the fiber of metal is not broken and the strength of the plates remains unaffected.

By superimposing a requisite number of spring plates 1 and positioning the bosses thereof in the sockets alined therewith, a leaf spring of predetermined strength may be built. These several leaf plates 1 are held together with the bosses and sockets thus alined, and with the former disposed downwardly, by means of the usual spring clips 4, such an arrangement being used both when the spring is employed as an overslung or as an underslung type.

Inasmuch as the spring S will function most efficiently when the bosses are depended as shown in the drawing, the invention as heretofore mentioned consists in providing a means for centering the several alined plates 1 with respect to the under side of an axle or the like A. In the present instance a socket 5 is formed in the under side of said axle and receives a cylindrical head 6 which is carried by a retaining plate 7 located between the uppermost of the spring plates 1 and the lower face of the axle A. This retaining plate 7 may be in the nature of a short independent plate, or one of the spring plates 1. In either case the chief function of this plate 7 is to carry the head 6 and a depending alined stud 8 which projects from the under side thereof and seats in the socket of said uppermost of the plates 1.

Any preferred means may be employed for securing the oppositely extended projections 6 and 8 to the plate 7, but in the illustrated embodiment of the invention said plate has a hole 9 punched therein, the lower end of which is countersunk as at 10. A shouldered plug having the head 6 at one end has its shank 11 disposed in said hole 9 after which the end thereof remote from the head 6 is upset to provide the stud 8 and a flange 12 which is located in the countersink 10. By this arrangement, that is to say by the provision of the engagement of the shoulder of the head 6 with the upper face of the plate 7 and the location of the flange 12, in the countersink, it is impossible for the projections 6 and 8 to become dis-alined or dis-engaged from the plate 7.

As shown from Fig. 1 the plate 7 becomes substantially a part of the spring S and very effectively retains the same in proper alinement with the under side of the axle A and against shifting with respect thereto when the shanks of the clips 4 are extended through the flanges 13 of the axle and locked by means of the nuts 14.

Various changes may be made in the form and proportions of the several parts of this spring structure and its retaining means without departing from the principles of the invention or sacrificing any of the important advantages.

I claim:

1. An underslung spring comprising a plurality of independent plates, each having a socket and a boss, each boss being extended downwardly and disposed in the socket of the next lower plate, an additional plate engaged with the uppermost of the first mentioned plates, a projection depended from the additional plate and disposed in the socket of said uppermost of the first mentioned plates, and a second upwardly extended projection on the additional plate adapted to be disposed in a socket in the under side of an axle or the like.

2. An underslung spring comprising a plurality of independent plates, each having a socket and a boss, each boss being extended downwardly and disposed in the socket of the next lower plate, an additional plate parallel to said first mentioned plates and having an opening therethrough, a plug extending through said opening and having each end enlarged so as to secure the same firmly in said plate, the lower end of said plug being extended into the socket of the uppermost of said first mentioned plates and the upper end being extended to form a boss adapted to engage a recess in the under side of an axle.

3. An underslung spring comprising a plurality of independent plates, each having a socket and a boss, each boss being extended downwardly and disposed in the socket of the next lower plate, an additional plate parallel to said first mentioned plates and having an opening therethrough, said opening being tapered from each side of the plate toward the middle, a tapered plug extending through said opening and having its smaller end upset so as to secure the same firmly in said plate, the lower end of said plug being extended into the socket of the uppermost of said first mentioned plates and the upper end being extended to form a boss adapted to engage a recess in the under side of an axle.

In testimony that I claim the foregoing I have hereunto set my hand at Milwaukee, in the county of Milwaukee and State of Wisconsin.

EARL F. BURGESS.